United States Patent
Ben-Moshe et al.

(10) Patent No.: US 12,093,237 B2
(45) Date of Patent: Sep. 17, 2024

(54) SYSTEMS AND METHODS FOR FORECASTING WARM START ITEMS

(71) Applicant: Anaplan, Inc., San Francisco, CA (US)

(72) Inventors: Lior Ben-Moshe, Kfar Saba (IL); Igal Nir, Lehavim (IL)

(73) Assignee: Anaplan, Inc., San Francisco, TX (US)

( * ) Notice: Subject to any disclaimer, the term of this patent is extended or adjusted under 35 U.S.C. 154(b) by 0 days.

(21) Appl. No.: 18/146,772

(22) Filed: Dec. 27, 2022

(65) Prior Publication Data

US 2023/0315711 A1  Oct. 5, 2023

Related U.S. Application Data

(60) Provisional application No. 63/324,874, filed on Mar. 29, 2022.

(51) Int. Cl.
*G06F 16/23* (2019.01)
*G06N 5/02* (2023.01)

(52) U.S. Cl.
CPC .............. *G06F 16/23* (2019.01); *G06N 5/02* (2013.01)

(58) Field of Classification Search
None
See application file for complete search history.

(56) References Cited

U.S. PATENT DOCUMENTS

| | | | | |
|---|---|---|---|---|
| 7,664,671 | B2* | 2/2010 | Shan | G06Q 30/0202 705/7.31 |
| 8,180,664 | B2* | 5/2012 | Shan | G06Q 30/0202 705/7.31 |
| 2006/0116920 | A1* | 6/2006 | Shan | G06Q 30/0202 705/7.31 |
| 2006/0116921 | A1* | 6/2006 | Shan | G06Q 10/06315 705/7.31 |
| 2018/0096254 | A1* | 4/2018 | Kang | G06N 5/02 |
| 2018/0308030 | A1* | 10/2018 | Nemati | G06Q 10/06314 |
| 2023/0315711 | A1* | 10/2023 | Ben-Moshe | G06N 5/02 |

* cited by examiner

*Primary Examiner* — Kim T Nguyen
(74) *Attorney, Agent, or Firm* — Chamberlain, Hrdlicka, White, Williams & Aughtry; Aly Z. Dossa

(57) ABSTRACT

A method for generating forecasts associated with items includes: obtaining a warm start forecasting request from a user; obtaining an item associated with the warm start forecasting request; obtaining item data associated with the item; making a determination that the item is a warm start item; in response to the determination: performing similarity calculations between the warm start item and additional items included in an item repository; identifying a portion of the additional items that are similar to the warm start item based on the similarity calculations; aggregating forecasts associated with the portion of the additional items to generate a warm start forecast; and providing the warm start forecast to the user.

20 Claims, 6 Drawing Sheets

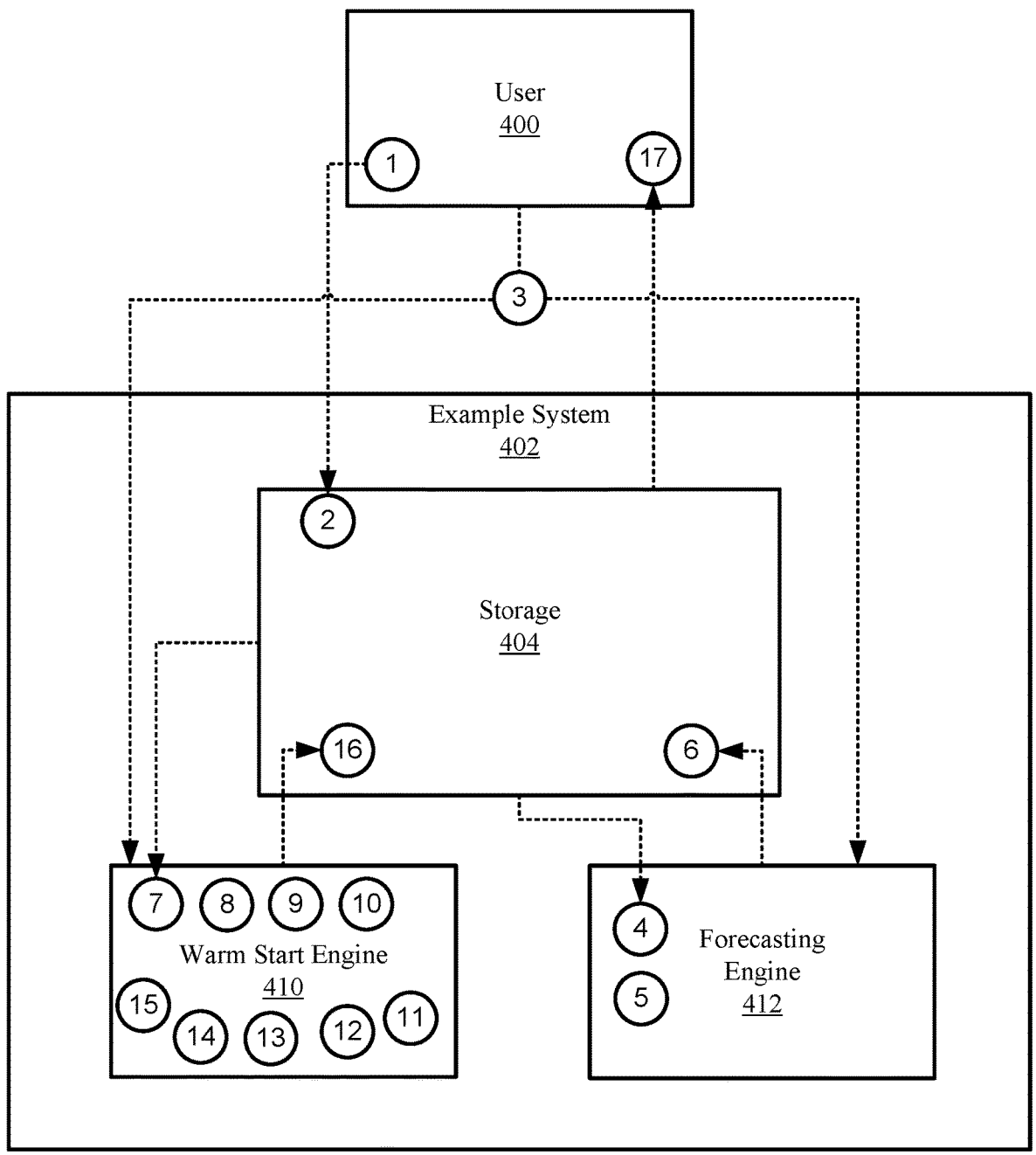
FIG. 4.1

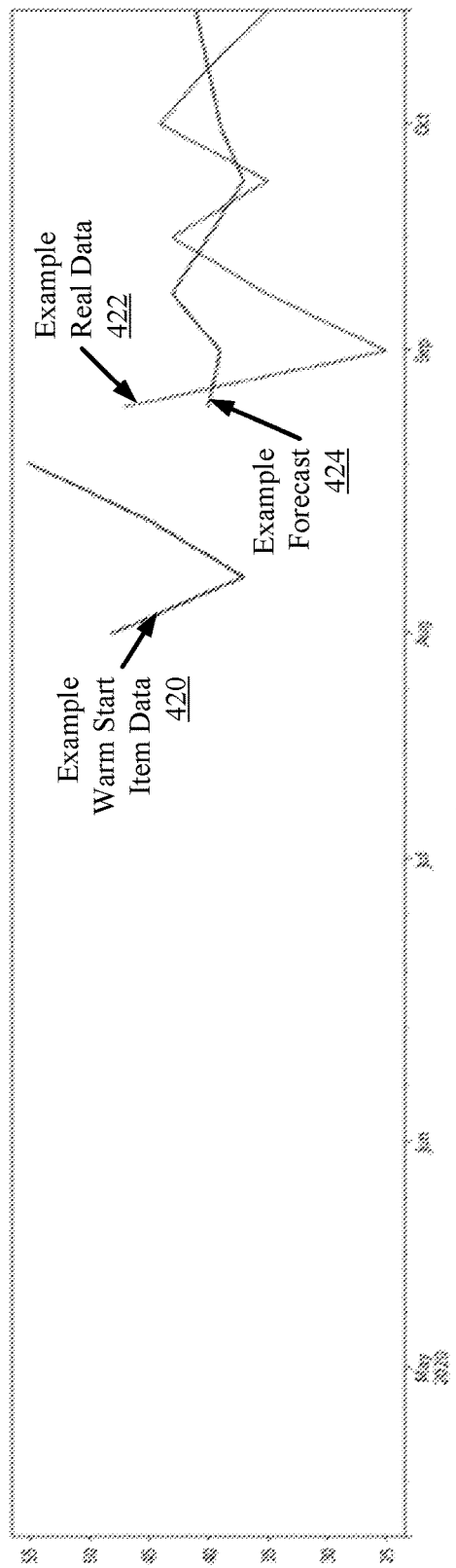
FIG. 4.2
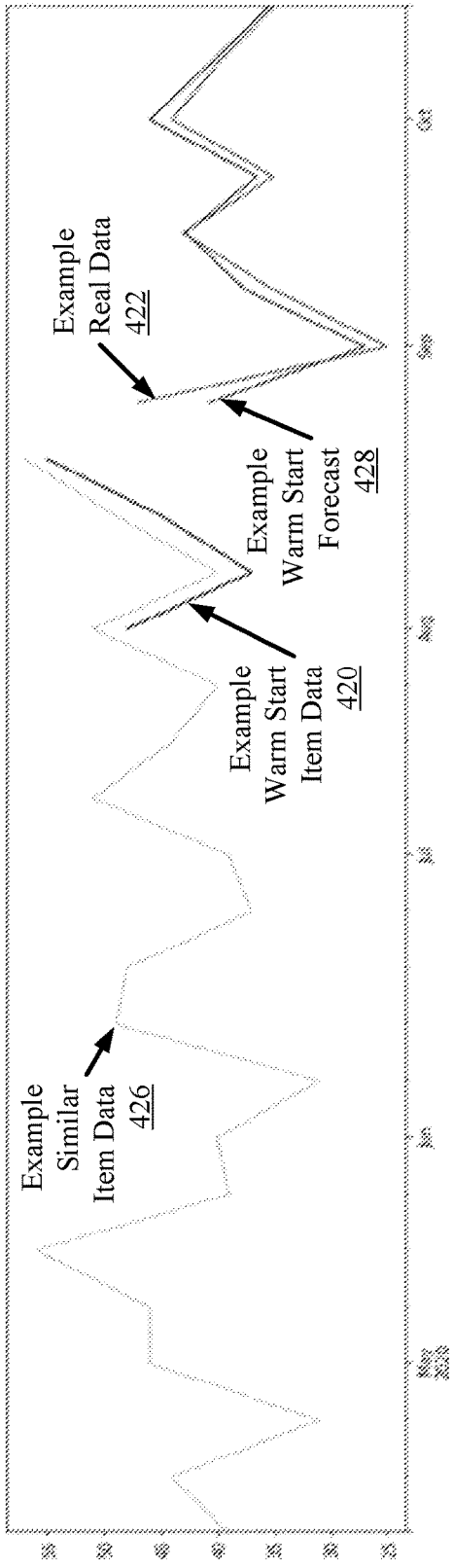
FIG. 4.3

SYSTEMS AND METHODS FOR FORECASTING WARM START ITEMS

BACKGROUND

Items may be associated with item data. The item data may change over time. A user may desire to anticipate future changes to the item data. To anticipate future changes to the item data, a forecast of the item data may be generated. The forecast may include predicted future data points of the item data. As a result, the user may use the forecast to anticipate future changes to the item data.

SUMMARY

In general, certain embodiments described herein relate to a method for generating forecasts of items, the method includes: obtaining a warm start forecasting request from a user; obtaining an item associated with the warm start forecasting request; obtaining item data associated with the item; making a determination that the item is a warm start item; in response to the determination: performing similarity calculations between the warm start item and additional items included in an item repository; identifying a portion of the additional items that are similar to the warm start item based on the similarity calculations; aggregating forecasts associated with the portion of the additional items to generate a warm start forecast; and providing the warm start forecast to the user.

In general, certain embodiments described herein relate to a non-transitory computer readable medium (CRM) comprising computer readable program code, which when executed by a computer processor enables the computer processor to perform a method for generating forecasts associated with items. The method includes: obtaining a warm start forecasting request from a user; obtaining an item associated with the warm start forecasting request; obtaining item data associated with the item; making a determination that the item is a warm start item; in response to the determination: performing similarity calculations between the warm start item and additional items included in an item repository; identifying a portion of the additional items that are similar to the warm start item based on the similarity calculations; aggregating forecasts associated with the portion of the additional items to generate a warm start forecast; and providing the warm start forecast to the user.

In general, certain embodiments described herein relate to a computing device configured for merging data. The computing device comprises: a memory; and a processor coupled to the memory. The processor is programmed to: obtain a warm start forecasting request from a user; obtain an item associated with the warm start forecasting request; obtain item data associated with the item; make a determination that the item is a warm start item; in response to the determination: perform similarity calculations between the warm start item and additional items included in an item repository; identify a portion of the additional items that are similar to the warm start item based on the similarity calculations; aggregate forecasts associated with the portion of the additional items to generate a warm start forecast; and provide the warm start forecast to the user.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations of embodiments disclosed herein by way of example and are not meant to limit the scope of the claims.

FIGS. 4.1-4.3 show examples in accordance with one or more embodiments.

DETAILED DESCRIPTION

Figure 1:
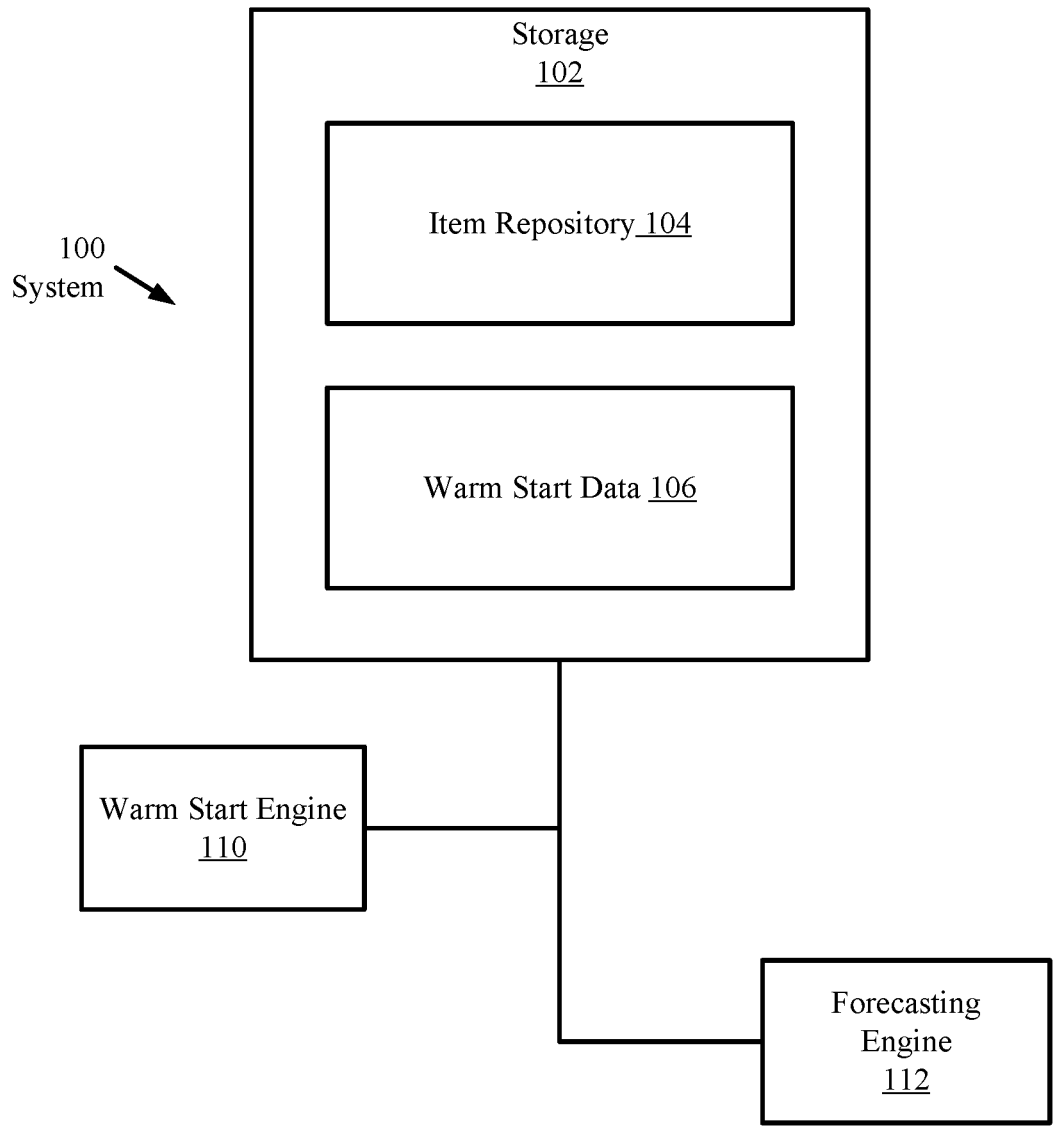
FIG. 1 shows a system in accordance with one or more embodiments.

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments disclosed are directed to systems and methods for forecasting warm start items.

In one or more embodiments, corporations (i.e., users) that sell products (i.e., items) may collect, or otherwise generate, data (i.e., item data) associated with the sale of such products. The collected data may include patterns and trends that change over time. To anticipate these trends and react accordingly, corporations may implement forecasting methods to generate item forecasts of item data that predict future item data based on past and/or present item data. The corporations may use the forecasts to adjust business strategies (e.g., marketing strategies, design strategies, geographic locations of sale, shipping strategies, inventory strategies, etc.) associated with the item based on trends and patterns specified by the item forecasts.

However, the aforementioned forecasting methods may face issues with warm start items. Warm start items, as used herein, may refer to items that include a limited quantity of item data. Due to the limited quantity of item data, the item forecasts generated for warm start items may be significantly inaccurate compared to real data collected over the time period of the item forecasts. The less item data associated with an item, the less accurate the item forecast of that item tends to be. As a result, corporations may be left with two options. First, a corporation may use the potentially inaccurate item forecasts associated with the warm start items to make potentially harmful adjustments in business strategies. Second, a corporation may wait and collect more item data for warm start items prior to generating item forecasts and making business adjustments. Such an option may increase the time required to make meaningful business adjustments, thereby potentially exacerbating faulty business strategies that are currently in place.

To address these issues, at least in part, embodiments disclosed herein relate to the performance of warm start operations to generate warm start forecasts of warm start items. More specifically, embodiments herein determine whether an item is a warm start item. If the item is a warm start item, then similarity calculations may be performed between other items and the warm start item. Items similar to the warm start item may be identified based on the similarity calculations. The item forecasts of the similar items may be aggregated into a single item forecast to generate a warm start forecast. The warm start forecast may then replace the item forecast of the warm start item. By using an aggregation of item forecasts of other items that are not warm start items (i.e., include more item data than the warm start item), the accuracy of the warm start forecast may be greater than the accuracy of the item forecast of the warm start item.

As a result, embodiments disclosed herein may improve the accuracy of forecasting warm start items. Traditional methods for forecasting warm start items may include using the limited quantity of item data associated with warm start items. Such traditional methods may be extremely inaccurate, especially if a very limited quantity of item data is associated with the warm start items. Through the improved accuracy of warm start forecasts, users may be more informed about future trends and patterns in the item data of warm start items, thereby enabling improved business adjustments associated with the warm start items based on the warm start forecasts.

Moreover, one of ordinary skill in the relevant art will appreciate that embodiments described herein may relate to any application or field involving time series forecasting of warm start items. Embodiments herein may not be limited to forecasting warm start items associated with product sales.

Various embodiments of the disclosure are described below.

FIG. 1 shows a system (100) in accordance with one or more embodiments. The system includes a storage (102), a warm start engine (110), and a forecasting engine (110). In one or more embodiments disclosed herein, the system (100) may be part of a computing system (e.g., 500, FIG. 5). Each of these components of the system (100) will be described in more detail below.

As shown in FIG. 1, the system (100) includes the storage (102). The storage (102) may be implemented using volatile or non-volatile storage or any combination thereof. The storage (102) may be configured to store one or more data structures. The data structures may include, for example, a container and/or one or more lists, tables, and/or collection of data values that store information. The data structures may include other types of data structures without departing from embodiments disclosed herein. The data structures stored by the storage (102) may include an item repository (104) and warm start data (106). The storage (102) may include other and/or additional data structures without departing from embodiments disclosed herein. Each of the aforementioned data structures stored in the storage (102) is discussed below.

In one or more embodiments, an item repository (104) may refer to one or more data structures that includes information associated with items. In one or more embodiments, an item may be a product or other object of interest that a user may desire to analyze through forecasting. The item may be associated with time series data. For example, an item may be a particular laptop and the time series data may include the weekly quantity of units sold for the past year. The item repository (104) may include item information associated with any quantity of items without departing from embodiments disclosed herein. For additional information regarding the item repository (104), please refer to FIG. 2.

In one or more embodiments, warm start data (106) may include one or more data structures that include information associated with warm start operations performed by the system (100). The warm start data (106) may be generated by the warm start engine (110) during the performance of a warm start operation. Such information may include similarity scores, warm start forecasts, warm start item criteria (e.g., upper threshold, lower threshold, variance threshold, all discussed below), aggregated forecasts, etc. generated and/or used during warm start operations. The warm start data (106) may include other and/or additional information associated with warm start operations without departing from embodiments disclosed herein. For additional information regarding warm start data (106), refer to FIG. 3.

While illustrated in FIG. 1 as stored in the storage (102), the item repository (104) and the warm start data (106) may be stored across any quantity and type of external storages or external computing devices (not shown) operatively connected to the system (100) via a network (e.g., the Internet, a LAN, a WAN, etc.) without departing from embodiments disclosed herein. All, or a portion of, the item repository (104) may be downloaded (e.g., via an application programming interface) or otherwise obtained from an external storage or an external computing device operatively connected to the system (100) prior to performing a warm start operation without departing from embodiments disclosed herein.

In one or more embodiments, the storage (102) may also store metadata (not shown). The metadata may include descriptive data associated with the item repository (104) and/or the warm start data (106). Examples of the metadata may include, but are not limited to: an identifier (e.g., filename), a storage location associated with item information and/or warm start data, etc. In one or more embodiments, the metadata may be stored as part of any of the data structurers (e.g., 104, 106). Alternatively, the metadata may be stored separately (i.e., independently) as its own entity within the storage (102).

In one or more embodiments disclosed herein, the system (100) further includes the warm start engine (110). The warm start engine (110) may be implemented in hardware (i.e., circuitry), software, or any combination thereof. In one or more embodiments, the warm start engine (110) may be configured to generate warm start forecasts as shown in more detail below in FIGS. 3-4.3. Additional details of the processes executed by the warm start engine (110) are discussed below in FIGS. 3-4.3.

In one or more embodiments disclosed herein, the system (100) further includes the forecasting engine (112). The forecasting engine (112) may be implemented in hardware (i.e., circuitry), software, or any combination thereof. In one or more embodiments, the forecasting engine (112) may be configured to generate forecasts of items using item data. Additional details regarding the processes executed by the forecasting engine (112) are discussed below in FIGS. 3-4.3.

Although the system (100) is shown as having three components (102, 110, 112), in other embodiments disclosed herein, the system (100) may have more or fewer components. For example, the functionality of each component described above may be split across components or combined into a single component (e.g., the functionalities of the warm start engine (110) and the forecasting engine (112) may be combined to be implemented by a single component). Further still, each component (102, 110, 112) may be utilized multiple times to carry out an iterative operation.

Figure 2:
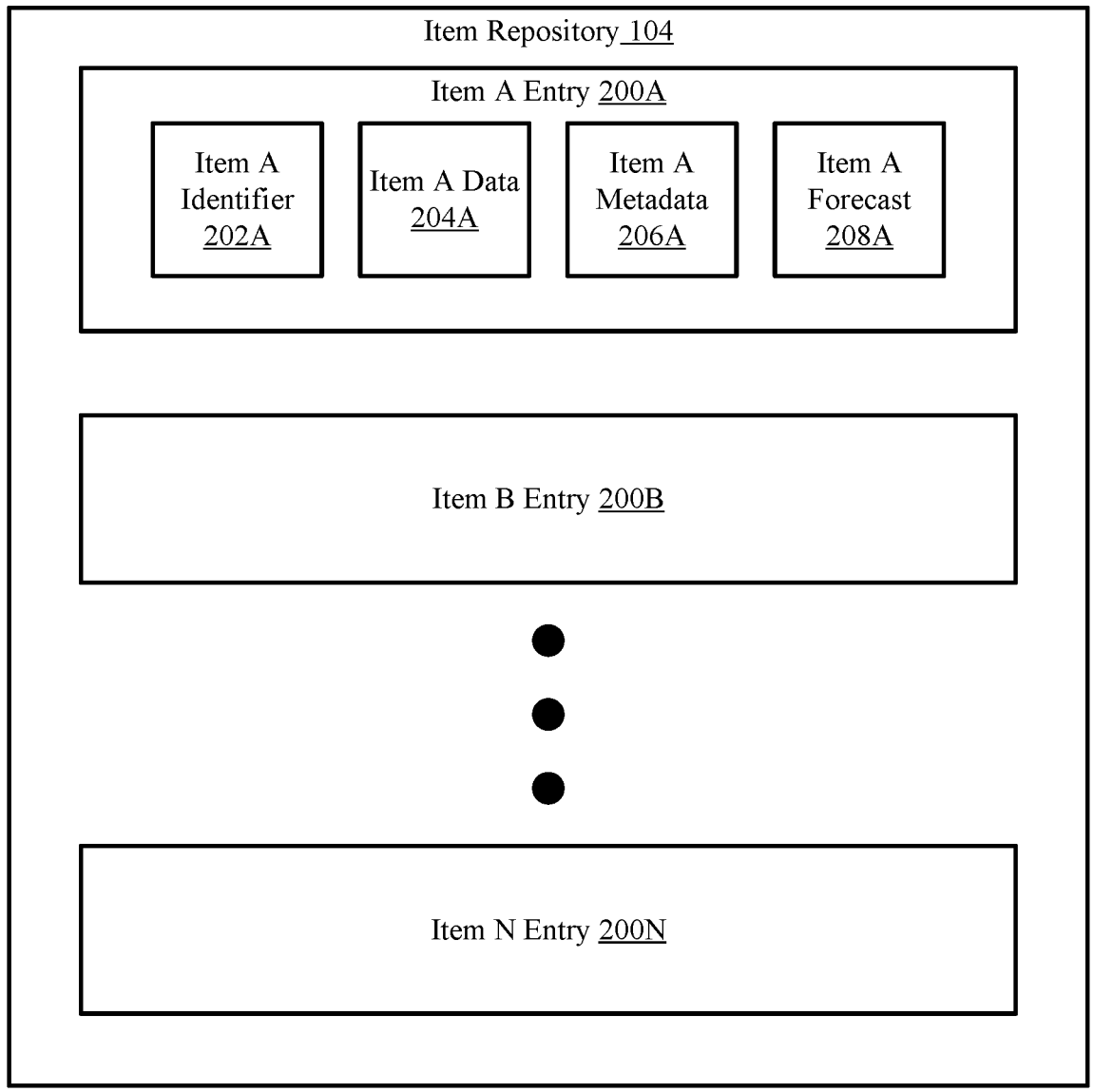
FIG. 2 shows an item repository in accordance with one or more embodiments.

FIG. 2 shows an item repository in accordance with one or more embodiments. As discussed above, the storage (102, FIG. 1) may include an item repository (104). The item repository (104) may be an embodiment of the item repository (104) discussed above in FIG. 1. As discussed above, the item repository (104) stores item information associated with items for which warm start operations are to be performed.

In one or more embodiments, the item repository (104) may include item entries associated with items. The item repository (104) may include any quantity of item entries without departing from embodiments disclosed herein. The item entries may include, for example, item A entry (200A), item B entry (200B), and item N entry (200N). Each item entry (e.g., 200A, 200B, 200N) may include an item identifier (e.g., 202A) and item data (e.g., 204A). Each item entry (e.g., 200A, 200B, 200N) may also optionally include item metadata (e.g., 206A). Item metadata may not be included in each item entry (e.g., 200A, 200B, 200N) without departing from embodiments disclosed herein. Each item entry (e.g., 200A, 200B, 200N) may further include an item forecast (e.g., 208A) generated during the warm start operation. These entry components are not shown in item B entry (200B) and item N entry (200N) for the sake of brevity. The item entries (e.g., 200A, 200B, 200N) may include other and/or additional information associated with the corresponding items without departing from embodiments disclosed herein. Each of the item entry components (e.g., 202A, 204A, 206A, 208A).

In one or more embodiments, an item identifier (e.g., 202A) may refer to a unique combination of numbers (e.g., numerical digits, bits, etc.) and/or characters (e.g., alphabetic characters, non-alphanumeric characters, etc.) that may be used to specify a particular item. Each item identifier (e.g., 202A) may be associated with a corresponding item. Each item identifier (e.g., 202A) may include any quantity of numbers and/or characters discussed above without departing from embodiments disclosed herein. An item identifier (e.g., 202A) may include other and/or additional information without departing from embodiments disclosed herein.

In one or more embodiments, item data (e.g., 204A) may refer to time series data associated with an item. As used herein, time series data may refer to one or more data points associated with an item. Each data point may be associated with a separate point or period of time. Each data point may also be associated with a data value. The item data may specify any observable information associated with an item without departing from embodiments disclosed herein. For example, item data may include number of units sold per day, the average sales price per month, number of items delivered per week, etc.

In one or more embodiments, item metadata (e.g., 206A) may refer to one or more attributes associated with an item and/or item data of the item. The item metadata (e.g., 206A) may include the item data frequency and the item data length. The item data frequency may specify the time period between the data points of the item data. In other words, the item data frequency may specify how often the data points were collected, generated, and/or otherwise observed. The item data frequency may include, for example, minutely, daily, weekly, monthly, quarterly, yearly, etc. Item data may be associated with any item data frequency without departing from embodiments disclosed herein. The item data period may specify the total time period associated with corresponding item data. In other words, the item data period may specify the difference between the first data point and the last data point included in the item data. The item data period may include, for example, a day, a week, a month, a quarter, a year, a decade, etc. Item data may be associated with any item data period without departing from embodiments disclosed herein.

In one or more embodiments, the item metadata (e.g., 206A) may include other and/or additional attributes associated with the item or the item data. The attributes may include, for example, geographical region (e.g., city, state, country, region), business unit or department (e.g., electronics, apparel, footwear, furniture, etc.), sales type (e.g., online order, in-person sale, etc.), organization, etc. The item metadata (e.g., 206A) may include other and/or additional attributes without departing from embodiments disclosed herein. The item metadata (e.g., 206A) may include other and/or additional information without departing from embodiments disclosed herein.

In one or more embodiments, all, or a portion, of the item identifier (e.g., 202A), the item data (e.g., 204A), and/or the item metadata (e.g., 206A) may be generated or otherwise obtained by one or more users and provided to the system (100, FIG. 1) via a user interface (discussed below) and/or any appropriate method of data transmission without departing from embodiments disclosed herein. In other embodiments, all, or a portion, of the item identifier (e.g., 202A), the item data (e.g., 204A), and/or the item metadata (e.g., 206A) may be generated or otherwise obtained by one or more third party entities (e.g., data collectors, sensors, monitoring services, etc.) and provided to the system (100, FIG. 1) using any appropriate method of data transmission without departing from embodiments disclosed herein. Upon, obtaining the item identifier (e.g., 202A), the item data (e.g., 204A), and/or the item metadata (e.g., 206A), the warm start engine (110, FIG. 1), forecasting engine (112, FIG. 1), and/or another entity not shown in the system (100, FIG. 1) may generate an item entry (e.g., 200A) within the item repository (104) and include the item identifier (e.g., 202A), the item data (e.g., 204A), and/or the item metadata (e.g., 206A) within the item entry (e.g., 200A).

In one or more embodiments, an item forecast (e.g., 208A) may refer to predicted future item data associated with an item. The predicted future item data may include any quantity of predicted future data points throughout any future time period without departing from embodiments disclosed herein. For example, an item forecast may include predicted monthly data points for the next year. An item forecast (e.g., 208A) may include other and/or additional information without departing from embodiments disclosed herein. The item forecast (e.g., 208A) may be generated by the forecasting engine (112) using item data (e.g., 204A). The forecasting engine (112, FIG. 1) may store the item forecast (e.g., 208A) in the corresponding item entry (e.g., 200A) of the item repository (e.g., 104). For additional information regarding generating item forecasts, refer to Step 304 of FIG. 3.

Figure 3:
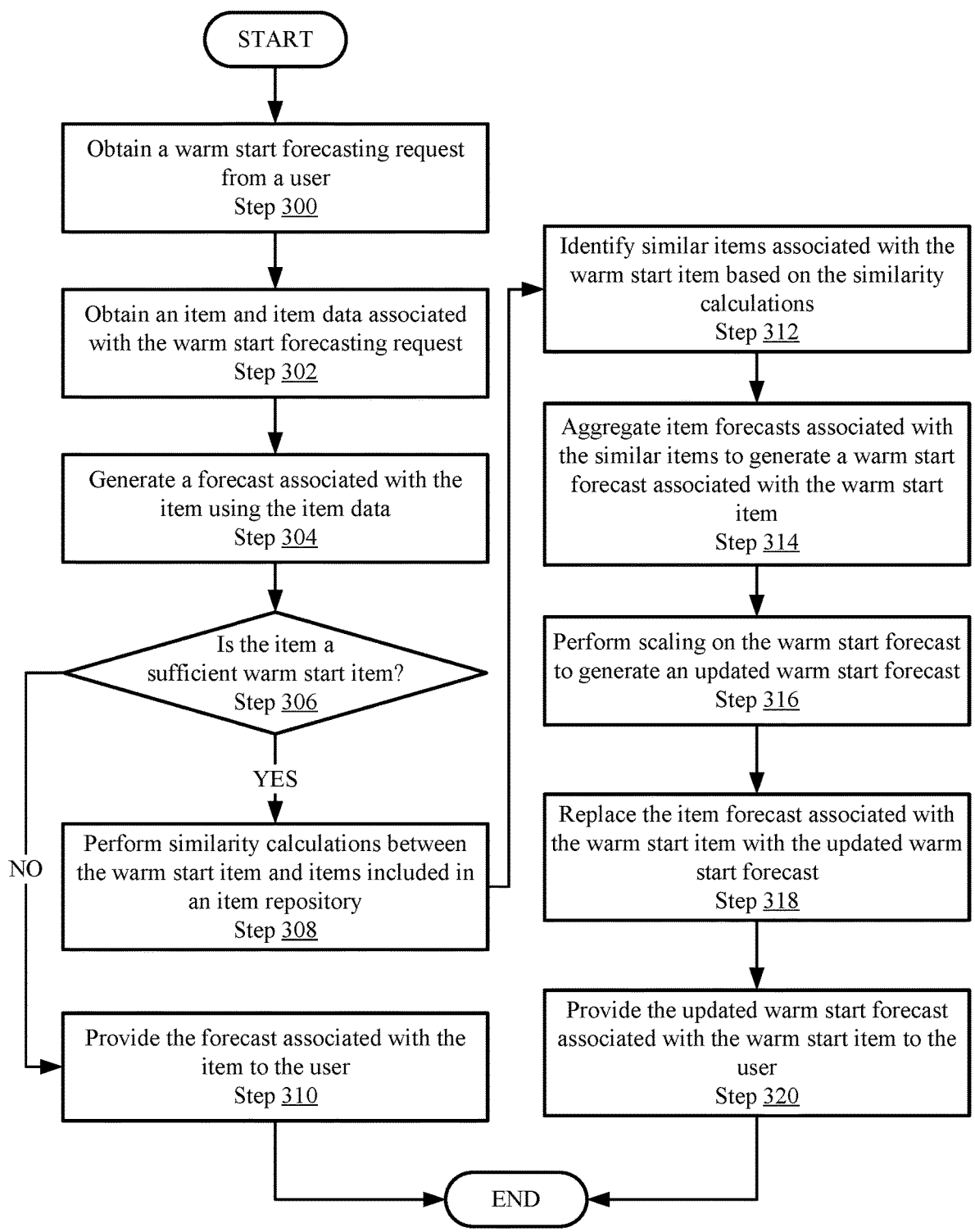
FIG. 3 shows a flowchart in accordance with one or more embodiments.

FIG. 3 shows a flowchart in accordance with one or more embodiments. FIG. 3 shows a flowchart of warm start operation in accordance to one or more embodiments disclosed herein. The method depicted in FIG. 3 may be performed to generate warm start forecasts associated with warm start items. The method shown in FIG. 3 may be performed, for example, by a combination of the warm start engine (e.g., 110, FIG. 1) and the forecasting engine (e.g., 112, FIG. 1). Other components of the system in FIG. 1 may perform all, or a portion, of the method of FIG. 3 without departing from the scope of the embodiments described herein.

While FIG. 3 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 300, a warm start forecasting request is obtained from a user. In one or more embodiments, a user may send a message to the warm start engine. The message may include a request to generate a warm start forecast, if needed, of an item associated with the request. The message may further include the item identifier specifying the item associated with the warm start request. The message may be sent using any appropriate method of data transmission without departing from embodiments disclosed herein. For example, the request may be sent as network packets through one or more network devices that operatively connect the user (e.g., a computing device operated by the user) and the warm start engine.

In one or more embodiments, a user may submit the warm start forecasting request using one or more input devices, output devices, and/or user interfaces of the system. A user interface may refer to an interface that allows users to interface with a computing device through, for example, graphical icons and/or other types of sensory stimuli (e.g., sounds). For example, a user interface may be a data structure that defines the information, arrangement, color, and/or other characteristics of portions of a display. The user interface may also be interactive in that it enables users to provide input (e.g., input information via mouse clicks, or pressing keys on a keyboard) with respect to different portions of the display. The user interface may include user interaction capabilities without departing from embodiments disclosed herein. For example, a user of the system may use an input device such as a mouse, keyboard, touch screen, etc., to interact with the elements of the user interface. User interactions may include scrolling, selecting buttons or icons, and/or other user interactions without departing from embodiments disclosed herein. The user interface may enable users to submit warm start forecasting requests, item identifiers, item data, and/or item metadata corresponding to items associated with the warm start requests. For additional information regarding input devices and output devices, refer to FIG. 5.

A warm start forecasting request may be obtained via other and/or additional methods without departing from embodiments disclosed herein.

In Step 302, item data corresponding to the item associated with the warm start forecasting request is obtained. As discussed above, an item identifier corresponding to the item associated with the warm start forecasting request may be obtained. The warm start engine may use the item identifier to determine whether an item entry of the item repository associated with the item corresponding to the item identifier includes item data. In one or more embodiments, if the obtained item identifier matches an item identifier included in an item entry of the item repository that includes item data, then the warm start engine may retrieve the item data from the item entry of the item repository. In one or more embodiments, if the obtained item identifier does not match an item identifier included in an item entry of the item repository that includes item data, the warm start engine may request a user to provide the item data (e.g., through a user interface, by sending a message to the user, etc.) associated with the item identifier. In response to obtaining the request, the user may provide the item data associated with the item identifier to the warm start engine, which may store a copy of the item data in an already generated item entry associated with the item identifier or in a new item entry. Item data corresponding to the item associated with the warm start forecasting request may be obtained via other and/or additional methods without departing from embodiments disclosed herein.

In Step 304, a forecast associated with the item is generated using the item data. In one or more embodiments, the warm start engine may provide the item data to the forecasting engine. The forecasting engine may generate a forecast associated with the item using the item data. The forecasting engine may apply one or more forecasting models to the item data that generate an item forecast as an output of the one or more forecasting model. The forecasting model may include any appropriate time series forecasting model (e.g., an autoregressive model, an autoregressive integrated moving average (ARIMA) model, a Prophet model, a seasonal autoregressive integrated moving average (SARIMA) model, an exponential smoothing (ES) model, a Long Short-Term Memory (LSTM) model, a DeepAR model, Temporal Fusion Transformer model, etc.) without departing from embodiments disclosed herein. The forecasting engine may store a copy of the item forecast in the item entry of the item repository corresponding to the item.

In one or more embodiments, the item forecast associated with the item data may have been generated prior to obtaining the warm start forecasting request. In such scenarios, the warm start engine may retrieve the item forecast from the item entry of the item repository corresponding to the item. The forecast associated with the item may be generated using the item data via other and/or additional methods without departing from embodiments disclosed herein.

In Step 306, a determination is made as to whether the item is a sufficient warm start item. In one or more embodiments, the warm start engine checks the item data, specifically the item data period and the item data frequency, to determine whether the item is a sufficient warm start item. To be considered a sufficient warm start item, the item data must include less than an upper threshold of data points and greater than a lower threshold of data points. If the item data includes more than the upper threshold of data points, then the item has too many data points to warrant the generation of a warm start forecast. In other words, the difference between the item forecast and a warm start forecast associated with the item will be insignificant. If the item data includes less than the lower threshold of data points, then the item will not have enough data points to generate an accurate warm start forecast. The similarity calculations used to identify similar items will be inaccurate, resulting in an inaccurate warm start forecast. The upper threshold and lower threshold may specify any quantity of data points without departing from embodiments disclosed herein as long as the upper threshold specifies more data points than the lower threshold. A user may configure the lower threshold and/or the upper threshold to specify desired quantities of data points to tune the warm start engine without departing from embodiments disclosed herein.

In addition to the above, in one or more embodiments, the warm start engine calculates an item data variance associated with the item data. The item data variance may be calculated using any appropriate method of variance calculation without departing from embodiments disclosed herein. The warm start engine may determine if the variance is above a variance threshold. If the variance is too low, below the variance threshold (e.g., the data points are the same or too similar), then the similarity calculations used to identify similar items will be inaccurate, resulting in an inaccurate warm start forecast. A user may configure the variance threshold to specify a desired variance to tune the warm start engine without departing from embodiments disclosed herein.

In one or more embodiments, if the number of data points included in the item data of an item is between the upper threshold and the lower threshold, and (ii) the item data includes a variance that is above a variance threshold, then the warm start engine may determine that the item is a sufficient warm start item. In one or more embodiments, if the number of data points included in the item data of an item is above the upper threshold then the warm start engine may determine that the item is not a warm start item. In one or more embodiments, if the number of data items is below the lower threshold or the variance of the item data is below the variance threshold, then the warm start engine may determine that the item is an insufficient warm start item.

In one or more embodiments disclosed herein, if the warm start engine determines that the item is a sufficient warm start item, then the method proceeds to Step 308. In one or more embodiments disclosed herein, if the warm start engine determines that the item is an insufficient warm start item or not a warm start item (not a sufficient warm start item), then the method proceeds to Step 310.

The determination as to whether the item is a sufficient warm start item may be made via other and/or additional methods without departing from embodiments disclosed herein.

In Step 308, similarity calculations between the warm start item and items included in an item repository are performed. In one or more embodiments, the warm start engine performs similarity calculations between the warm start item and the items included in the item repository by generating a similarity score between the warm start item and each of the items included in the item repository. The similarity score between the warm start item and an item included in the item repository may include the product of (i) the absolute value of the correlation (e.g., Pearson correlation) between the item data of the warm start item and the item data of the item included in the item repository, (ii) the scale ratio between the item data of the warm start item and the item data of the item in the item repository, and, if available, (iii) the number of shared attributes included in the item metadata of the warm start item and the item metadata of the item in the item repository. The higher the similarity score, the higher the similarity between the warm start item and the item included in the item repository. The similarity scores may be generated using other and/or additional calculations without departing from embodiments disclosed herein. The similarity calculations between the warm start item and items included in an item repository may be performed via other and/or additional methods without departing from embodiments disclosed herein.

In one or more embodiments, a scale ratio may refer to the ratio between properties of the item data of one item and the properties of the item data of another item. The scale ratio may include the frequency scale ratio (i.e., how often data points are observed for an item (e.g., daily, weekly, yearly, etc.)), the period scale ratio, (i.e., the range in time over which the data points are observed (e.g., a day, a month, a quarter, a year, etc.)), and/or the data value scale ratio (i.e., the range of data values (e.g., 1-10, 10-100, 100-1,000, 1000-10,000, etc.)). The scale ratio may be generated by the warm start engine. The scale ratio may be used in Step 308 above for similarity calculations and may also be used in Step 316 to perform scaling. For example, a first item may include three data points with values of 1, 2, and 3. A second item may include three data points with values of 10, 20, and 30. The data value scale ratio between the second item and the first item may be 10:1. During scaling, the first item may be multiplied by 10 or the second item may be multiplied by ¹⁄₁₀ to match the data value scales between the two items. The scale ratio may refer to other and/or additional information associated with items without departing from embodiments disclosed herein.

In Step 310, the item forecast associated with the item is provided to the user. In one or more embodiments, if the item is not a warm start item, the warm start engine may simply provide the forecast of the item to the user. In one or more embodiments, the warm start engine may provide the item forecast to the user as a part of a message sent to the user. The message may further include the item identifier specifying the item associated with the item forecast. The message may be sent using any appropriate method of data transmission without departing from embodiments disclosed herein. For example, the message may be sent as network packets through one or more network devices that operatively connect the user (e.g., a computing device operated by the user) and the warm start engine. In one or more embodiments, the warm start engine may use one or more output devices and user interfaces of the system discussed above to provide the item forecast to the user.

In one or more embodiments, if the item is an insufficient warm start item, the warm start engine may provide the item forecast of the insufficient warm start item along with a notification or warning specifying that the item is an insufficient warm start item and the cause of the insufficiency. As discussed above, the cause of the insufficiency may include an insufficient quantity of data points included in the item data (the quantity of data points was below the lower threshold), and/or the variance of the item data was below the variance threshold. In one or more embodiments, the warm start engine may provide the item forecast and the notification or warning to the user as a part of a message sent to the user. The message may further include the item identifier specifying the item associated with the item forecast. The message may be sent using any appropriate method of data transmission without departing from embodiments disclosed herein. For example, the message may be sent as network packets through one or more network devices that operatively connect the user (e.g., a computing device operated by the user) and the warm start engine. In one or more embodiments, the warm start engine may use one or more output devices and user interfaces of the system discussed above to provide the item forecast and the notification or warning to the user.

In one or more embodiments, if the item is an insufficient warm start item, the warm start engine may only provide a notification or warning specifying that the item is an insufficient warm start item and the cause of the insufficiency. As discussed above, the cause of the insufficiency may include an insufficient quantity of data points included in the item data (the quantity of data points was below the lower threshold), and/or the variance of the item data was below the variance threshold. In one or more embodiments, the warm start engine may provide the notification or warning to the user as a part of a message sent to the user. The message may further include the item identifier specifying the item associated with the item forecast. The message may be sent using any appropriate method of data transmission without departing from embodiments disclosed herein. For example, the message may be sent as network packets through one or more network devices that operatively connect the user (e.g., a computing device operated by the user) and the warm start engine. In one or more embodiments, the warm start engine may use one or more output devices and user interfaces of the system discussed above to provide the notification or warning to the user.

In one or more embodiments, the user may perform one or more forecasting actions based on the item forecast and/or the notification or warning. The forecasting actions may include, for example, adjusting sales actions (e.g., marketing strategies, item inventories, geographic location of sale, etc.) associated with the item, doing nothing, collecting more item data, etc. The forecasting actions may include other and/or additional actions associated with the item forecast and/or the notification or warning without departing from embodiments described herein.

In one or more embodiments disclosed herein, the method ends following Step 310.

In Step 312, similar items associated with the warm start item are identified based on the similarity calculations. As discussed above, the warm start engine may generate similarity scores between the warm start item and each item included in the item repository. In one or more embodiments, the warm start engine may compare the similarity scores to a minimum similarity threshold. The warm start engine may identify all items corresponding to similarity scores that are above the minimum similarity threshold as similar items. The minimum similarity threshold may be configurable by a user without departing from embodiments disclosed herein. The warm start engine may identify any quantity of similar items without departing from embodiments disclosed herein. Similar items associated with the warm start item may be identified based on the similarity calculations via other and/or additional methods without departing from embodiments disclosed herein.

In Step 314, item forecasts associated with the similar items are aggregated to generate a warm start forecast associated with the warm start item. In one or more embodiments, the warm start engine may retrieve the item forecasts associated with the similar items, if available, from the item repository. If the item forecasts of one or more similar items are not included in the item repository, then the warm start engine may send the item data of the one or more similar items to the forecasting engine. The forecasting engine may use the obtained item data to generate item forecasts of the one or more similar items via the method discussed above in Step 304, and provide the item forecasts to the warm start engine. The warm start engine may store a copy of the item forecasts in corresponding item entries of the item repository.

In one or more embodiments, the warm start engine aggregates the item forecasts of the similar items into a single forecast to generate a warm start forecast associated with the warm start item. The warm start forecast may be generated using any appropriate method(s) of item forecast aggregation (e.g., averaging, k-means clustering, etc.) without departing from embodiments disclosed herein. For example, the warm start forecast may be the mean of the item forecasts. If the item forecasts are not associated with the same scale (e.g., frequency, period, and/or data value range), the warm start engine may performing scaling on the item forecasts. For additional information regarding scaling, refer to Step 316. Item forecasts associated with the similar items may be aggregated to generate a warm start forecast associated with the warm start item via other and/or additional methods without departing from embodiments disclosed herein.

In Step 316, scaling is performed on the warm start forecast to generate an updated warm start forecast. In one or more embodiments, the warm start forecast may include a different scale(s) than the warm start item. In other words, the warm start forecast may include data items with a different frequency scale, a different period scale, and/or a different data value scale than the item data of the warm start item. For example, the warm start forecast may include a daily frequency, over a period of a month, with data values that range from one to ten, whereas the item data of the warm start item may include a weekly frequency, over a period of two months, with data values that range from ten to one-hundred. In one or more embodiments, the warm start engine performs scaling on the warm start forecast to generate an updated warm start forecast that includes the same frequency (e.g., frequency scale), period (e.g., period scale), and/or data value range (e.g., data value scale) as the item data of the warm start item. The warm start engine may use any appropriate method(s) of scaling (e.g., linear regression, interpolation, multiplying item data by a scale ratio, etc.) without departing from embodiments disclosed herein. After performing scaling, the updated warm start forecast will include the same scale as the item data of the warm start item. In one or more embodiments, if the warm start forecast does not require scaling (i.e., the warm start forecast includes the same scale as the item data of the warm start item), then Step 316 may be skipped. Scaling may be performed on the warm start forecast to generate an updated warm start forecast via other and/or additional methods without departing from embodiments disclosed herein.

In Step 318, the item forecast associated with the warm start item is replaced with the updated warm start forecast. In one or more embodiments, the warm start engine may delete the item forecast associated with the warm start item and store a copy of the updated warm start forecast in the item entry of the item repository corresponding to the warm start item. The updated warm start forecast may include more accurate predicted future data points than the original item forecast of the warm start item. The item forecast associated with the warm start item may be replaced with the updated warm start forecast via other and/or additional methods without departing from embodiments disclosed herein.

In Step 320, the updated warm start forecast associated with the warm start item is provided to the user. In one or more embodiments, the warm start engine may provide the updated warm start forecast to the user as a part of a message sent to the user. The message may further include the item identifier specifying the item associated with the updated warm start forecast. The message may be sent using any appropriate method of data transmission without departing from embodiments disclosed herein. For example, the message may be sent as network packets through one or more network devices that operatively connect the user (e.g., a computing device operated by the user) and the warm start engine. In one or more embodiments, the warm start engine may use one or more output devices and user interfaces of the system discussed above to provide the updated warm start forecast to the user. The updated warm start forecast associated with the warm start item may be provided to the user via other and/or additional methods without departing from embodiments disclosed herein.

In one or more embodiments, the user may perform one or more forecasting actions based on the updated warm start forecast. The forecasting actions may include, for example, adjusting sales actions (e.g., marketing strategies, item inventories, geographic location of sale, etc.) associated with the warm start item, doing nothing, collecting more item data, etc. The forecasting actions may include other and/or additional actions associated with the updated warm start forecast without departing from embodiments described herein.

In one or more embodiments disclosed herein, the method ends following Step 320.

In one or more embodiments, the methods described above in FIG. 3 may be repeated any number of times to perform warm start operations for any number of items associated with a warm start forecasting request without departing from embodiments disclosed herein.

FIGS. 4.1-4.3 show examples in accordance with one or more embodiments. In particular, FIG. 4.1 shows an example system and actions performed by the example system over time. FIGS. 4.2-4.3 show example visual representations of data used and generated in the example actions of FIG. 4.1. FIGS. 4.1-4.3 are intended to illustrate simple examples associated with embodiments disclosed herein for explanatory purposes. No parts of the system, actions performed by the system, or visual representations shown in the examples of FIGS. 4.1-4.3 should be used to limit how a warm start forecast is generated for a warm start item.

Beginning of Examples

Consider a scenario as shown in FIG. 4.1 in which a user (400) requests an example system (402) to perform a warm start operation. The example system (402) includes a storage (404), a warm start engine (410), and a forecasting engine (412). Initially, at Step 1, the user generates an item. The user also generates an item identifier, item data, and item metadata associated with the item. At Step 2, the user sends the item identifier, the item data, and the item metadata to the example system (402). The example system (402) generates an item entry in an item repository (not shown) stored in the storage (404), and includes the item identifier, the item data, and the item metadata in the item entry. At Step 3, the user (400) sends a warm start forecasting request associated with the item to the warm start engine (410).

In response to obtaining the warm start forecasting request, at Step 4, the warm start engine (410) determines that the item entry associated with the item does not include an item forecast. Therefore, the warm start engine (410) sends a request to generate an item forecast of the item to the forecasting engine (412). The request includes the item identifier associated with the item. At Step 5, the forecasting engine (412) obtains item data from the item entry associated with the item using the item identifier. Then, at Step 6, the forecasting engine (412) generates an item forecast using the item data and stores the item forecast in the item repository associated with the item. The forecasting engine (412) notifies the warm start engine (410) that the item forecast generation is complete. At Step 7, the warm start engine (410) determines, using the item data associated with the item, that the item is a sufficient warm start item. The item data includes a number of data points that is above a lower threshold and below an upper threshold, and the variance of the item data is above a variance threshold.

At Step 8, the warm start engine (410) obtains item data and item metadata associated with all other items included in the item repository. At Step 9, the warm start engine (410) performs similarity calculations between each item and the warm start item. The similarity calculations include generating similarity scores between each item and the warm start item based on item data and item metadata. A similarity score is the product of the Pearson correlation between the item data of the warm start item and the item data of another item, the scale ratio between the item data of the warm start item and the item data of the other item, and the number of same attributes included in the item metadata of the warm start item and the item metadata of the other item.

After generating the similarity scores, at Step 10, the warm start engine (410) identifies similar items to the warm start item. The warm start engine (410) identifies items corresponding to similarity scores that are above a similarity threshold as similar items. The similar items include item data of the same item data frequency (i.e., daily) and item data period (i.e., one year). The similar items include a total of three other items. At Step 11, the warm start engine (410) aggregates the item forecasts associated with the three other items into a single item forecast to generate the warm start forecast. The item forecasts are aggregated by taking the mean of each predicted future data point at each point in time. At Step 12, the warm start engine (410) uses linear regression to perform scaling on the warm start forecast to generate an updated warm start forecast the matches the scale of the item data of the warm start item. The item data of the warm start item includes a weekly item data frequency over an item data period of one year. After generating the updated warm start forecast, at Step 13, the warm start engine (410) replaces the item forecast of the warm start item with the updated warm start forecast in the item entry associated with warm start item. Finally, at Step 14, the warm start engine (410) provides the updated warm start forecast associated with the warm start item to the user (400). The user then uses the updated warm start forecast to perform forecasting actions.

Turning to FIG. 4.2, FIG. 4.2 shows an example visual representation of generating an item forecast of a warm start item. As shown in FIG. 4.2, the example warm start item data (420) includes a limited amount of item data associated with the warm start item. The example item forecast (424) shows the item forecast generated using the example warm start item data (420). The example item forecast (424) includes predicted future item data associated with the warm start item. The example real data (422) includes actual item data observed over time associated with the warm start item. As shown in FIG. 4.2, there is substantial differences between the example item forecast (424) and the example real data (422). The limited quantity of item data associated with warm start items yields inaccurate item forecasts as the forecasting models do not have enough data points to generate accurate item forecasts. To address this issue, a warm start operation is performed.

Turning to FIG. 4.3, FIG. 4.3 shows an example visual representation of generating a warm start forecast for the same warm start item discussed above in FIG. 4.2. As shown in FIG. 4.3, the example warm start item data (420) includes a limited amount of item data associated with the warm start item. The example warm start forecast (428) shows a warm start forecast generated using the example similar item data (426) of an item similar to the warm start item. The example similar item data (426) includes significantly more data points than the example warm start item data (420). The example warm start forecast (428) includes the item forecast generated using the example similar item data (426), and replaces the example item forecast (424) generated in FIG. 4.2. As shown in FIG. 4.3, the example warm start forecast (428) is much more similar to the example real data (422) than the example item forecast (424) of FIG. 4.2. Said another way, the example warm start forecast (428) is more accurate than the example item forecast (424, FIG. 4.2).

End of Examples

Figure 5:
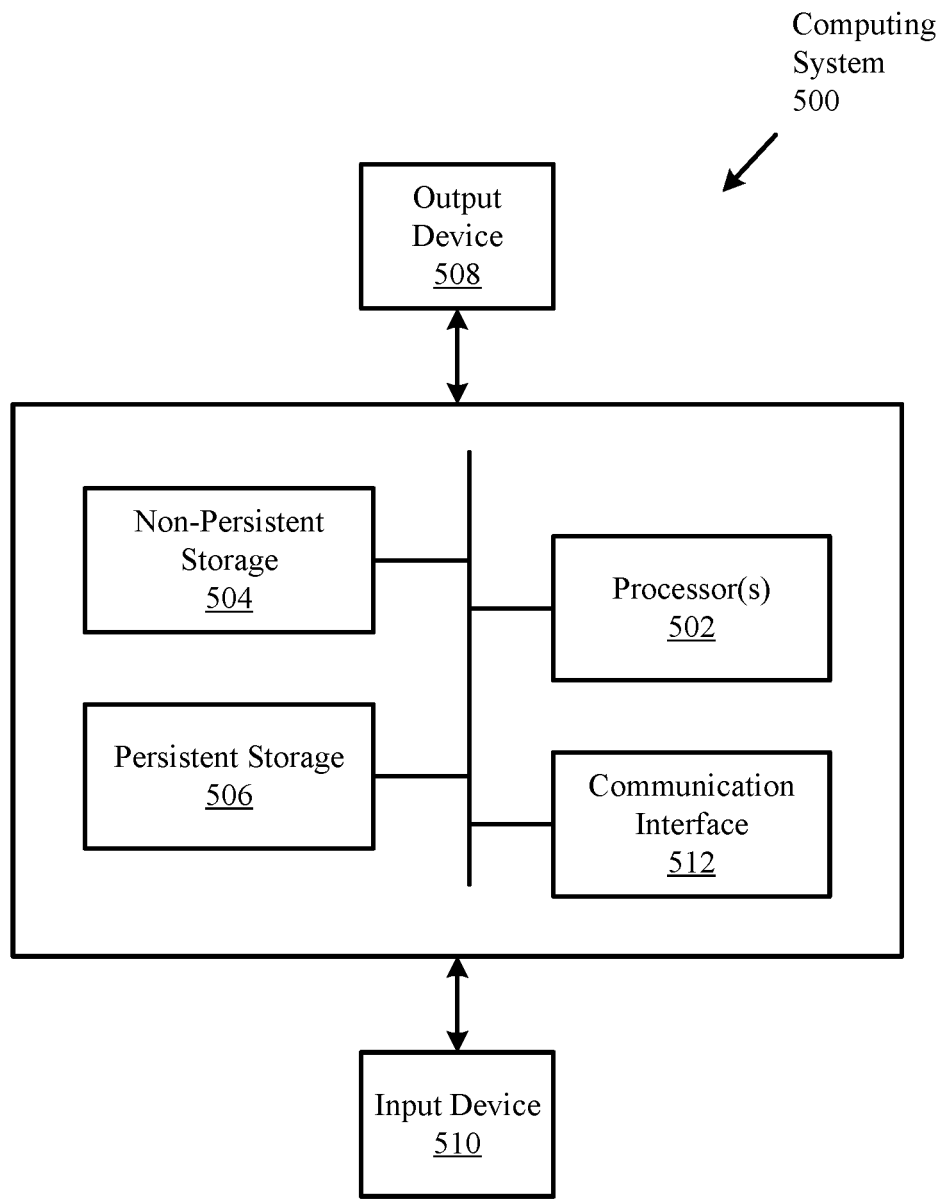
FIG. 5 shows a computer system in accordance to one or more embodiments.

FIG. 5 shows a computer system in accordance to one or more embodiments.

Embodiments disclosed herein may be implemented using computing devices and/or computing systems. FIG. 5 shows a diagram of a computing device in accordance with one or more embodiments disclosed herein. Computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), communication interface (512) (e.g., Bluetooth interface, infrared interface, network interface, optical interface, etc.), input devices (510), output devices (508), and numerous other elements (not shown) and functionalities. Each of these components is described below.

In one embodiment disclosed herein, computer processor(s) (502) may be an integrated circuit for processing instructions. For example, the computer processor(s) may be one or more cores or micro-cores of a processor. Computing system (500) may also include one or more input devices (510), such as a touchscreen, keyboard, mouse, microphone, touchpad, electronic pen, or any other type of input device. Further, communication interface (512) may include an integrated circuit for connecting computing system (500) to a network (not shown) (e.g., a local area network (LAN), a wide area network (WAN) such as the Internet, mobile network, or any other type of network) and/or to another device, such as another computing system.

In one embodiment disclosed herein, computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (502), non-persistent storage (504), and persistent storage (506). Many different types of computing devices exist, and the aforementioned input and output device(s) may take other forms.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium. As discussed above, embodiments disclosed herein may be implemented using computing devices.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed throughout this disclosure should be understood as being examples of problems solved by embodiments disclosed herein and the embodiments disclosed herein should not be limited to solving the same/similar problems. The disclosed embodiments are broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for generating forecasts associated with items, the method comprising:
    obtaining a warm start forecasting request from a user;
    obtaining an item associated with the warm start forecasting request;
    obtaining item data associated with the item;
    making a determination that the item is a warm start item;
    in response to the determination:
        performing similarity calculations between the warm start item and additional items included in an item repository;

identifying a portion of the additional items that are similar to the warm start item based on the similarity calculations;

aggregating forecasts associated with the portion of the additional items to generate a warm start forecast; and providing the warm start forecast to the user.

2. The method of claim 1, wherein the item data comprises time series data associated with the item.

3. The method of claim 1, wherein the warm start item is associated with a limited quantity of item data.

4. The method of claim 1, wherein making the determination that the item is a warm start item comprises:

identifying a quantity of data included in the item data; and making a second determination that the item data meets the warm start item criteria.

5. The method of claim 1, wherein aggregating forecasts associated with the portion of the additional items to generate the warm start forecast further comprises rescaling the warm start forecast based on item data associated with the warm start item.

6. The method of claim 1, identifying the portion of the additional items that are similar to the warm start item based on the similarity calculations comprises generating a similarity score between the warm start item and each additional item.

7. The method of claim 6, wherein the portion of the additional items that are associated with the warm start item are associated with similarity scores above a minimum similarity threshold.

8. The method of claim 1, further comprising:

obtaining a second warm start forecasting request from a user;

obtaining a second item associated with the second warm start forecasting request;

obtaining second item data associated with the second item;

generating a forecast associated with the second item using the second item data;

making a second determination that the item is not a warm start item; and in response to the second determination:
providing the forecast to the user.

9. A non-transitory computer readable medium comprising computer readable program code, which when executed by a computer processor enables the computer processor to perform a method for generating forecasts associated with items, the method comprising:

obtaining a warm start forecasting request from a user;
obtaining an item associated with the warm start forecasting request;
obtaining item data associated with the item;
making a determination that the item is a warm start item;
in response to the determination:
performing similarity calculations between the warm start item and additional items included in an item repository;
identifying a portion of the additional items that are similar to the warm start item based on the similarity calculations;
aggregating forecasts associated with the portion of the additional items to generate a warm start forecast; and
providing the warm start forecast to the user.

10. The non-transitory computer readable medium of claim 9, wherein the item data comprises time series data associated with the item.

11. The non-transitory computer readable medium of claim 9, wherein the warm start item is associated with a limited quantity of item data.

12. The non-transitory computer readable medium of claim 9, wherein making the determination that the item is a warm start item comprises:

identifying a quantity of data included in the item data; and making a second determination that the item data meets the warm start item criteria.

13. The non-transitory computer readable medium of claim 9, wherein aggregating forecasts associated with the portion of the additional items to generate the warm start forecast further comprises rescaling the warm start forecast based on item data associated with the warm start item.

14. The non-transitory computer readable medium of claim 9, identifying the portion of the additional items that are similar to the warm start item based on the similarity calculations comprises generating a similarity score between the warm start item and each additional item.

15. The non-transitory computer readable medium of claim 14, wherein the portion of the additional items that are associated with the warm start item are associated with similarity scores above a minimum similarity threshold.

16. The non-transitory computer readable medium of claim 9, wherein the method further comprising:

obtaining a second warm start forecasting request from a user;

obtaining a second item associated with the second warm start forecasting request;

obtaining second item data associated with the second item;

generating a forecast associated with the second item using the second item data;

making a second determination that the item is not a warm start item; and in response to the second determination:
providing the forecast to the user.

17. A computing device comprising:
a memory; and
a processor coupled to the memory, wherein the processor is programmed to:
obtain a warm start forecasting request from a user;
obtain an item associated with the warm start forecasting request;
obtain item data associated with the item;
make a determination that the item is a warm start item;
in response to the determination:
perform similarity calculations between the warm start item and additional items included in an item repository;
identify a portion of the additional items that are similar to the warm start item based on the similarity calculations;
aggregate forecasts associated with the portion of the additional items to generate a warm start forecast; and
provide the warm start forecast to the user.

18. The computing device of claim 17, wherein the item data comprises time series data associated with the item.

19. The computing device of claim 17, wherein the warm start item is associated with a limited quantity of item data.

20. The computing device of claim 17, wherein making the determination that the item is a warm start item comprises:
- identifying a quantity of data included in the item data; and
- making a second determination that the item data meets the warm start item criteria.

* * * * *